(12) United States Patent
Kimmel et al.

(10) Patent No.: US 6,968,766 B2
(45) Date of Patent: Nov. 29, 2005

(54) COMPLIANT WORKHOLDER FOR MACHINERY

(76) Inventors: Darryl D. Kimmel, 4617 Skyline Dr., Fort Collins, CO (US) 80526; Donald L. Hildred, P.O. Box 410, 2603 Brookhill Rd., LaPorte, CO (US) 80535

( * ) Notice: Subject to any disclaimer, the term of this patent is extended or adjusted under 35 U.S.C. 154(b) by 74 days.

(21) Appl. No.: 10/780,036

(22) Filed: Feb. 17, 2004

(65) Prior Publication Data

US 2004/0250902 A1  Dec. 16, 2004

Related U.S. Application Data

(63) Continuation-in-part of application No. 10/058,471, filed on Jan. 28, 2002, now Pat. No. 6,718,857.

(51) Int. Cl.[7] .......................... B27B 27/00; B26D 7/06
(52) U.S. Cl. ........................................ 83/447; 83/475
(58) Field of Search ........................ 83/447, 475, 446

(56) References Cited

U.S. PATENT DOCUMENTS

| | | | |
|---|---|---|---|
| 481,983 A | 9/1892 | Thom | |
| 1,848,145 A * | 3/1932 | Steindorff et al. | 83/446 |
| 2,525,894 A | 10/1950 | Graham | |
| 2,612,914 A * | 10/1952 | Reynolds | 144/250.18 |
| 2,722,247 A | 11/1955 | Schroeder et al. | |
| 3,218,899 A * | 11/1965 | Everett | 269/153 |
| 3,860,050 A | 1/1975 | Banks | |
| 3,927,706 A | 12/1975 | Davey | |
| 4,039,108 A | 8/1977 | Hahn et al. | |
| 4,184,718 A | 1/1980 | Banach | |
| 4,428,263 A * | 1/1984 | Lindee et al. | 83/354 |
| 4,476,757 A | 10/1984 | Morris | |
| 4,830,075 A | 5/1989 | Jenkner | |
| 5,272,897 A | 12/1993 | Wern | |
| RE34,994 E * | 7/1995 | Bonyman | 144/253.6 |

* cited by examiner

Primary Examiner—Charles Goodman
(74) Attorney, Agent, or Firm—Thomas W. Hanson

(57) ABSTRACT

A compliant system of workholders for use with woodworking, metalworking, or other machinery each of which pushes against a workpiece with substantially constant pressure while moving in and out to accommodate variation in the size of the workpiece. Preferably, the workholder uses a feather board mounted on one or more sliding guide rods. Rollers, a low friction shoe, or other elements may also be used to contact the workpiece. A pneumatic cylinder is the preferred mechanism for applying outward pressure to the feather board. The workholder will retract on activation of a momentary switch by the user and will remain retracted for an adjustable time period to allow positioning of the workpiece.

12 Claims, 12 Drawing Sheets

COMPLIANT WORKHOLDER FOR MACHINERY

CROSS-REFERENCE TO RELATED APPLICATIONS

This application is a continuation-in-part of application Ser. No. 10/058,471, filed Jan. 28, 2002, now U.S. Pat. No. 6,718,857.

STATEMENT REGARDING FEDERALLY SPONSORED RESEARCH OR DEVELOPMENT

Not Applicable

BACKGROUND OF THE INVENTION

1. Field of the Invention

The present invention relates to the field of workholders or hold downs for machinery and specifically to such workholders which act to urge a workpiece, such as a board, against a fence or other guide.

2. Background Information

There are a wide variety of applications in which a substantially linear workpiece is fed into or through a machine which performs some operation on the workpiece. In carrying out this operation, it is common to use a fence, or other guide, to properly align the workpiece. A simple example is ripping a board on table saw. In order for the fence to be effective, the workpiece must be held tightly against the fence. While this may be done by hand, safety, accuracy, and productivity concerns often dictate the use of a workholder.

These workholders may be rollers, springs, featherboards, or any of a variety of similar devices. Their operation is relatively straight forward. A feather board for example is attached to the table of the machine, adjusted so that it contacts the edge of the board at the correct angle and with the desired pressure, and then locked down. Common to most of these workholders is that they must be adjusted to the width of the workpiece and reset if that width changes or another workpiece is substituted. While they can accommodate a small amount of variation in the width of the workpiece, such as an inch or so, they are not intended to accommodate large variation.

This is troublesome in several circumstances. The first is where the edge of the board being contacted by the workholder is irregular. This is common in rough cut lumber for example. The edge may be wavy, varying 2 or 3 inches (or more) along the length of the board. A conventional workholder which is set properly for the narrowest portion, will jamb at the widest portion. If set for the widest portion, it will lose contact with the narrowest portion, failing to perform its function. Even where the variation is within limits, wide variations in pressure on the workpiece may result, affecting feed rates and finish quality of the operation. A second circumstance is where the board tapers, perhaps by design. This is similar to the above, but may have a significantly greater range of width which must be accommodated. A third circumstance is where a series of strips is being removed from the fence side of the workpiece. At each pass, the workpiece becomes narrower, requiring the workholder be reset as often as each pass.

The last situation, above, can be addressed with conventional workholders, but can seriously impact the productivity, and enjoyment, of the operation. The first two situations can not be handled by conventional workholders, and performing the operation without the workholders may pose a serious safety risk by requiring hand guiding.

The above situations may also involve dimensional variation in more than one direction. The simplest is where the workpiece varies in both width and thickness, and the operation requires that the workpiece be held both horizontally against a fence and vertically against the table. Other circumstances may require other orientations of the second workholder.

There is a need for a workholder for use with machinery which can accommodate relatively wide variations in the width of the workpiece, or variations in the contour of the edge which it contacts. It should also readily adapt to width variations between workpieces without requiring manual repositioning. It should maintain a relatively constant pressure against the workpiece despite these variations. Ideally its operation would require minimal intervention by the operator and be adaptable to circumstances or operator preferences. Also ideally, it would also allow for at least two separate workholders, commonly controlled for applying force in two or more directions.

BRIEF SUMMARY OF THE INVENTION

The present invention is directed to a system of two or more compliant workholders for use with a piece of machinery, the workholders preferably using one or more pneumatic pistons to press a feather board or other contact element against the workpiece with substantially constant pressure. The pistons(s) allow the contact element to move in and out, following the edge of the workpiece as its profile varies.

According to the invention each of the workholder is provided with a frame which is mounted to the piece of machinery, a guide rod which slides in the frame, a head mounted on the outer end of the rod, and a mechanism for pushing the head outward against the workpiece.

According to an aspect of the invention the head will mount a resilient contact element, such as a feather board to make contact with the workpiece.

According to another aspect of the invention the head is retracted when the user presses a switch and remains retracted for a user selectable period of time.

According to yet another aspect of the invention, the timing of the workholders is individually adjustable, and either may be set to extend before the other.

The advantages of such an apparatus are that the head maintains substantially constant pressure against the workpiece while extending and retracting to follow the contour of the workpiece. The resilient contact element, such as a feather board, adapts to more minor irregularities. The easy retraction simplifies insertion of the workpiece, eases user operation, and increases the likelihood that the workholder will be used. Workpiece to workpiece variations are also accommodated as the head will extend until the workpiece is contacted, or the movement limits reached.

The above and other features and advantages of the present invention will become more clear from the detailed description of a specific illustrative embodiment thereof, presented below in conjunction with the accompanying drawings.

DETAILED DESCRIPTION OF THE INVENTION

The following discussion focuses on the preferred embodiment of the invention, as a compliant feather board for a table saw. However, as will be recognized by those skilled in the art, the disclosed method and apparatus are applicable to a wide variety of situations in which it is desired to hold a possibly varying size workpiece against a fence or quite with constant pressure.

Glossary

The following is a brief glossary of terms used herein. The supplied definitions are applicable throughout this specification and the claims unless the term is clearly used in another manner.

Cutter—the element of the machine to which the invention is attached which cuts, shapes, or otherwise acts on the workpiece.

Featherboard—that portion of the invention in direct contact with the workpiece. Generally similar to a conventional featherboard, but could encompass a leaf spring, roller, or slide arrangement.

Fence—a guide, typically perpendicular to the table which guides the workpiece into or through the cutter.

Table—generally that surface of the machine to which the invention is attached which supports the workpiece.

Workpiece—a piece of stock or material which is fed through the machine to which the invention is attached and which the invention acts upon.

Preferred Embodiment

The disclosed invention is described below with reference to the accompanying figures in which like reference numbers designate like parts. Generally, numbers in the 200's refer to prior art elements or elements in the surrounding environment while numbers in the 100's refer to elements of the invention.

Overview

Figures 4, 5:
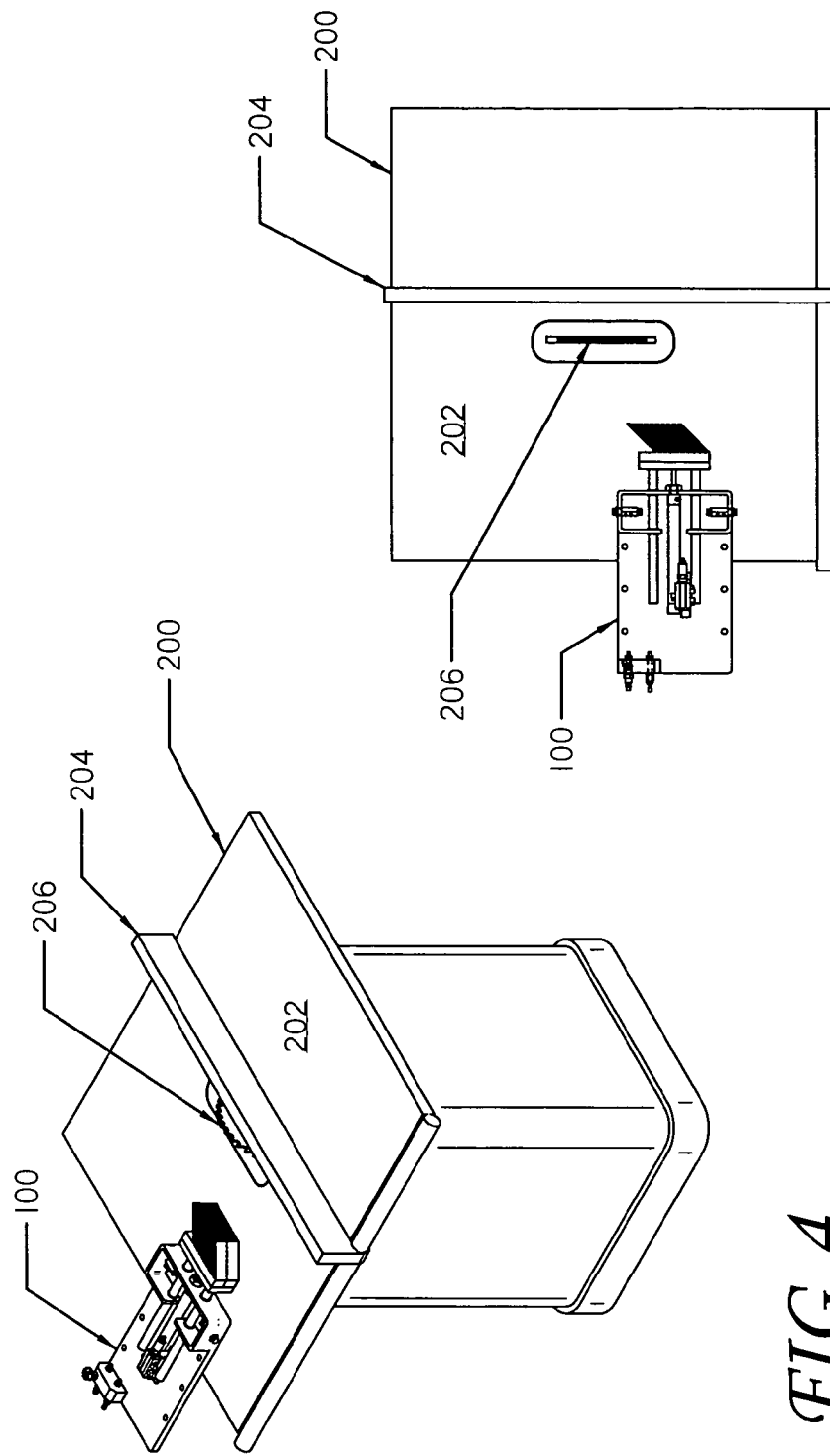
FIG. 4 is an isometric view of the inventive workholder installed on a representative machine, a table saw.
FIG. 5, is a top view of the inventive workholder installed on a table saw.

The present invention is a pneumatically operated compliant workholder, 100, for attachment to the table, 202, of a stationary woodworking machine, 200, or similar device, to hold a workpiece against the fence, 204, or other guide, as the workpiece is fed through or into a cutter, 206. See FIGS. 4 and 5. While the original embodiment was developed for use with a table saw, the inventive device is clearly usable with a wide variety of other woodworking tools such as shapers and joiners and with machinery used for working metal, plastic, or other materials. Its potential applicability is as broad as any application requiring a workpiece to be urged against a guide while being fed through a machine which operates on the workpiece.

The novelty of the invention lies in its ability to tolerate large dimensional variation in the workpiece while maintaining a substantially constant pressure. In the preferred embodiment, the individual fingers of the featherboard follow the edges of the workpiece and accommodate small variations in the edge contour. Larger variations are accommodated by the pneumatic piston(s) which urge the head, on which the featherboard is mounted, toward the workpiece. Each piston is free to move in and out, maintaining substantially constant pressure throughout the range of motion of the piston.

While the preferred embodiment utilizes pneumatically activated pistons, other options are anticipated. Other fluid power systems would also work such as a hydraulic system which has been adapted to maintain constant pressure against the workpiece while allowing movement of the head. Active control of positive control elements such as stepper motors and/or linear activators could also be used in place of the pistons, but suffer significant disadvantages in terms of complexity and cost.

Structure

Figure 1:
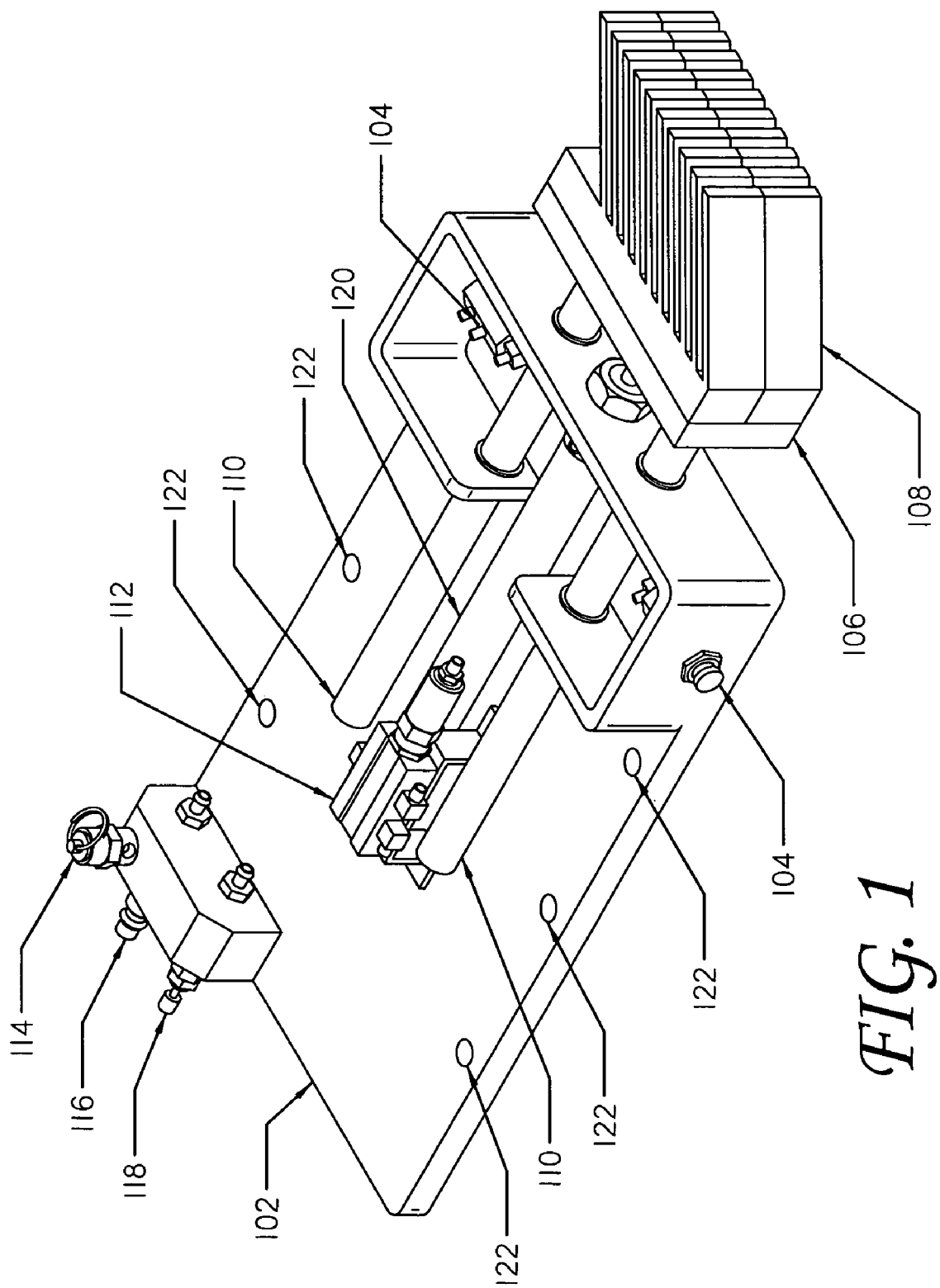
FIG. 1 is an isometric view of the preferred embodiment of the present invention, with the air hoses removed for clarity.
Figure 2:
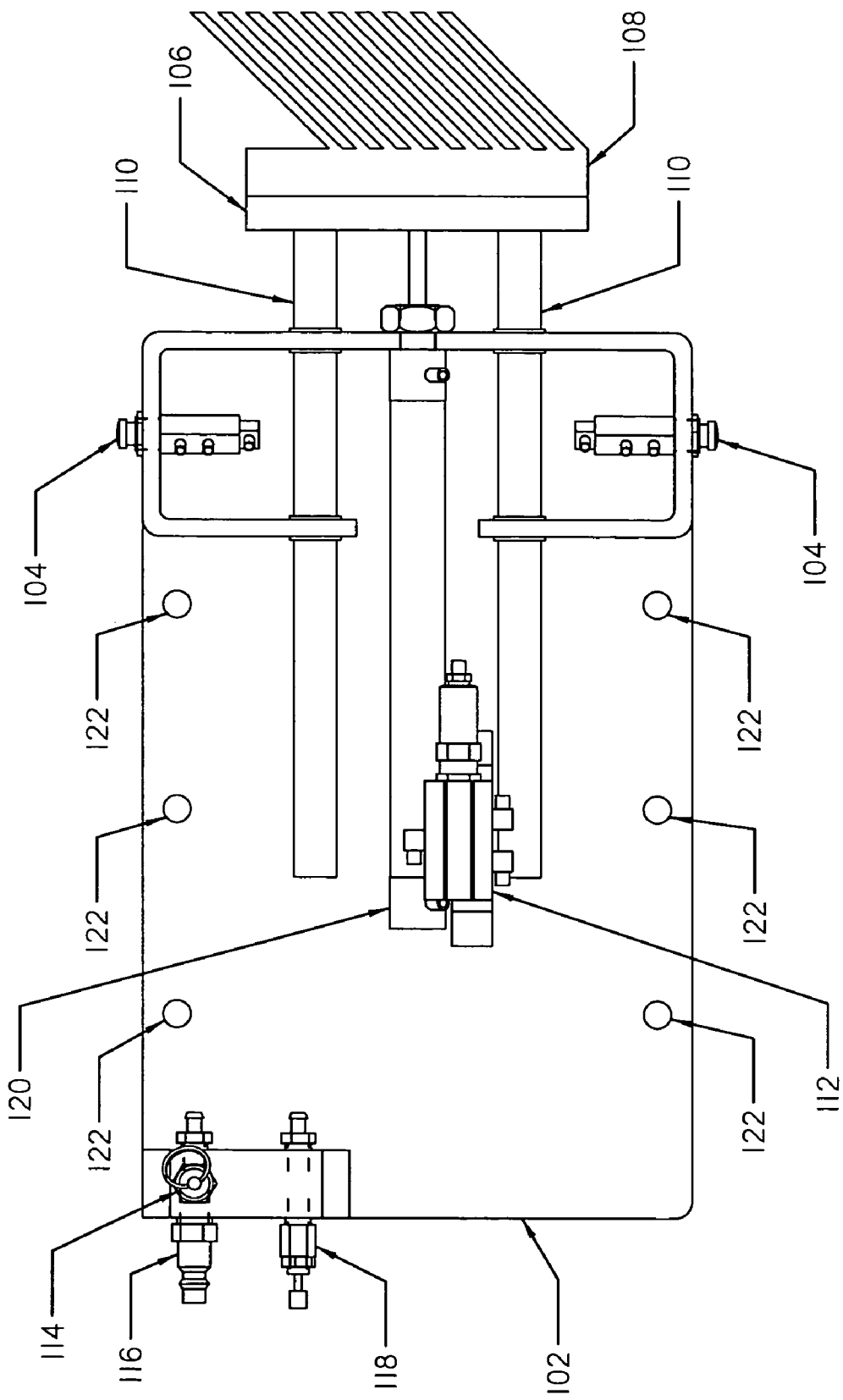
FIG. 2 is a top view of the preferred embodiment of the present invention, with the air hoses removed.

Referring to FIGS. 1 and 2, the structure of the inventive workholder can be seen in more detail. Note that the required lines, or tubes, interconnecting the various pneumatic components have been removed for clarity. They are shown diagrammatically in FIG. 3. The frame, 102, provides attachment points and structural support for the other components. It also mounts to the table of the machine on which the device is installed via holes, 122, for mounting bolts or through the use of clamps. Featherboard, 108, mounts to head, 106, which in turn mounts to guide rods, 110, allowing the head to slide in and out relative to the end of the frame. The dual rod configuration of this embodiment provides a solid mount for the head while allowing linear motion in only one dimension and eliminating all rotational motion. This substantially eliminates all lateral and angular stress on the piston, decreasing wear on the piston.

The featherboard, 108, is the preferred mechanism for making contact with the workpiece. Each finger flexes individually, providing resilient contact with the workpiece. The angle of the fingers provides a measure of kickback protection by digging into or gripping the workpiece if it attempts to reverse direction. In the preferred embodiment, the featherboard is comprised of two or more identical sections which are stacked vertically, as shown. Additional sections can be added if desired or only one section may be used. This adapts the device to varying workpiece thicknesses and to the clearance requirements of different machines. This multiple section configuration can also reduce replacement cost as the featherboard wears and must be replaced as only those sections actually exhibiting wear need be replaced. The configuration also improves the functionality of the featherboard by increasing the number of separate fingers in the featherboard. Two vertically adjacent fingers can react separately to different contours in the workpiece which exist at different heights. Clearly a single, unitary featherboard could also be used if preferred. Also, the featherboard and head could be integral if preferred.

The head, 106, and featherboard, 108, are urged outward against the workpiece by the action of the double acting piston, 120, which also serves to retract the head and featherboard. Note that the piston could also attach to the rod rather than directly to the head. Air flow to the piston, and thus the action of the piston, is controlled by valve, 112, which is itself pneumatically controlled by activation switches, 104. Bleed valve, 118, cooperates with the activation switches to provide a time delay for extension of the piston. The details of the controls and piston activation are discussed in detail below with reference to FIG. 3. Coupling, 116, provides a connection to a source of compressed air which may be conventional shop air. Pressure relief, 114, prevents the occurrence of an overpressure condition within the device and is not required for effective operation of the device. An optional cover may be provided as illustrated with the alternative embodiment discussed below.

Figure 3:
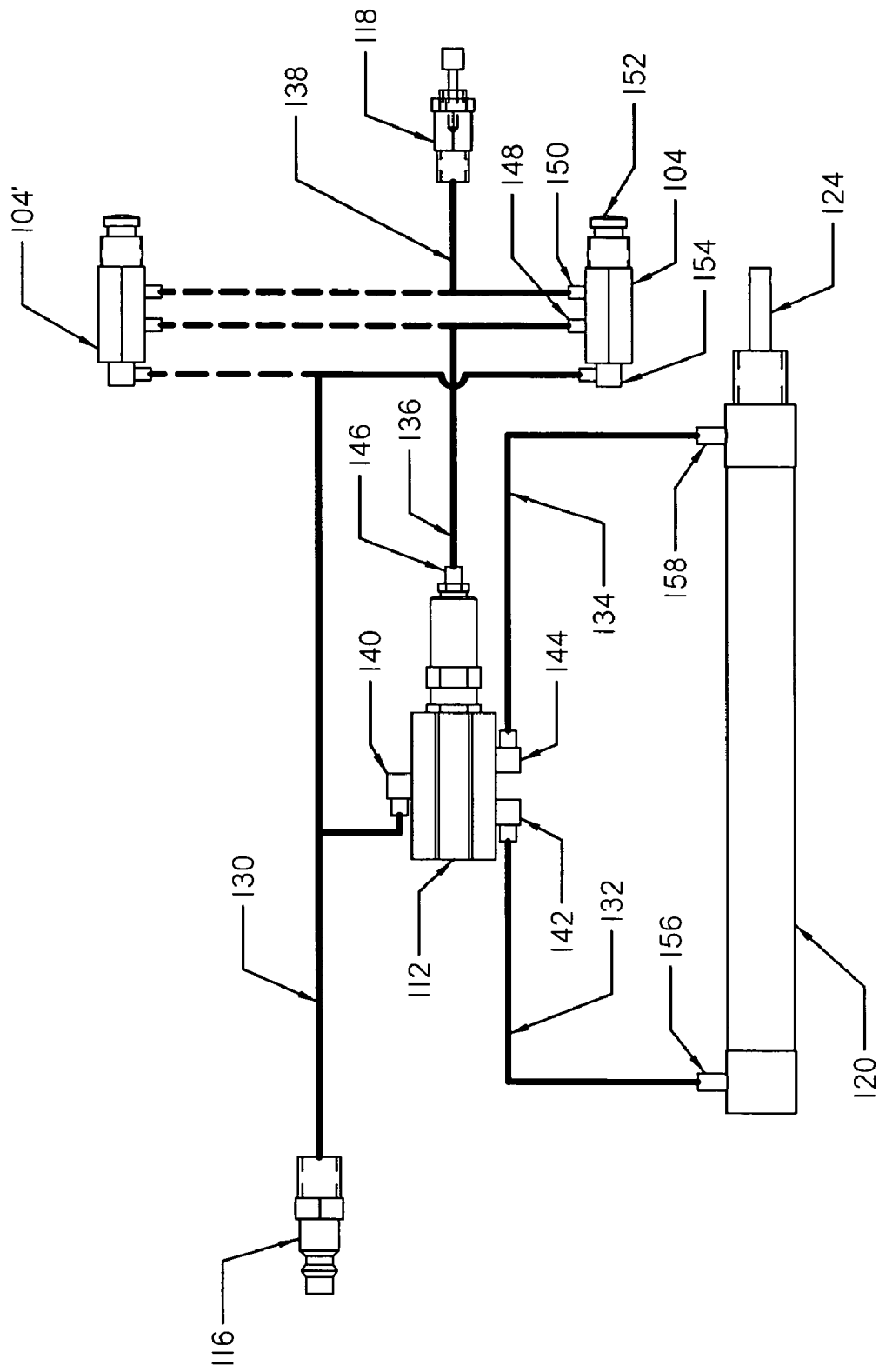
FIG. 3 is a diagram of the pneumatic components of the invention and their interconnecting air hoses or lines.

The preferred configuration of the pneumatic components is illustrated in FIG. 3. Note that the following description refers to a single activation switch, 104. The preferred embodiment uses a second activation switch, 104', and additional switches can be added in parallel as desired. If desired, one or more of these activation switches may be located remote from the device, attached to the machine, carried by the operator, or in any other location as long as they are connected as illustrated. Clearly other types of remote activation could also be provide, such as radio frequency, or infrared as long as the same functionality is provided.

Connection, 116, provides an air supply at a constant, regulated pressure. Preferably, this pressure can be adjusted by the operator to regulate the holding pressure of the inventive device. If desired, this pressure regulator could be integrated into the device itself. Line, 130, conveys this supply air to inlet port, 140, of the valve, 112, and inlet port, 154, of activation switch, 104. The valve has two positions. In its relaxed state, where no air pressure is applied to its control port, 146, the valve couples its inlet port, 140, to outlet port, 142. Tube 132, connects port 142 to port, 156, of the piston, 120, causing it to extend rod, 124, which then extends the featherboard. The result of this is that the normal, steady state condition of the device is that pressure is maintained to extend the piston.

Activation switch, 104, is a two position momentary switch with its outlet port, 148, connected to the control port, 146, of the valve, 112, via line 136. Inlet port, 154, is connected to the supply air and inlet port, 150, is connected to bleed valve, 118. In its normal, relaxed state, the activation switch couples outlet port, 148, to inlet port, 150. This connects the bleed valve, 118, to the control port, 146, of the valve, assuring that the control port will eventually return to atmospheric pressure (unless the bleed valve is fully closed).

When button, 152, is depressed, inlet port, 154, is momentarily coupled to outlet port, 148. This applies pressure to the control port, 146, of the valve, causing the valve to activate. When activated, the valve vents outlet port, 142, and couples inlet port, 140, to outlet port, 144, supplying pressure to port, 158, of the piston, causing it to retract. The piston will remain retracted as long as pressure is maintained above a certain, device dependent, threshold level on the control port, 146 of the valve. When button, 152, is released, it will return under spring pressure to its relaxed state, again coupling the bleed valve, 118, to the control port, 146, of the valve. The bleed valve is, preferably, an adjustable needle valve which controls the escape of the air pressure which has been applied to the control port. The rate of this escape effectively controls a time delay from when the button is released until the valve is released and the piston extends. In the preferred embodiment, this can be easily varied in a continuous range from almost instantaneous to a minute or more. Once the valve, 112, is released, the piston extends under full supply pressure.

Clearly other schemes could be easily adopted including one in which the rate of extension could be regulated, either separately from, or in combination with the above time delay. A simple approach to this is to use a spring to urge the piston (and featherboard) outward, rather than air pressure, and to couple a bleed valve to the retraction port, 158. The air pressure must then overcome the spring pressure in order to retract the piston and the bleed valve will gradually release this pressure allowing the piston to extend at a regulated rate. Another approach is to supplement the configuration of the preferred embodiment with a needle valve and bypass on line, 132, so that the rate at which supply air is provided to extend the piston is regulated, but it is allowed to vent unrestricted. Clearly, paired single acting pistons could also be used in place of a double acting piston. Herein, the disclosed double acting piston is intended to considered as comprising two separate means: one for extension and one for retraction.

Extended System

Figure 12:
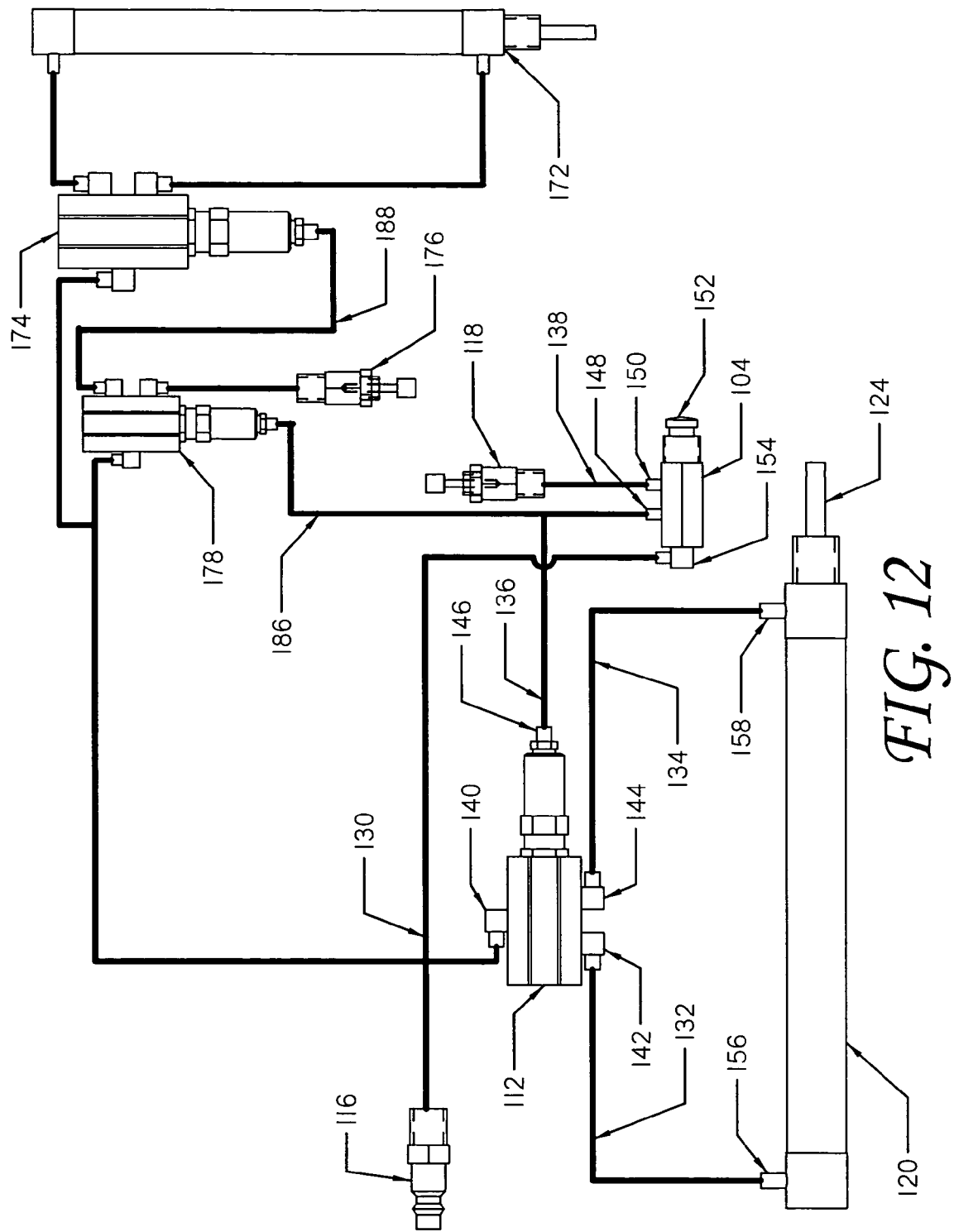
FIG. 12 is a diagram of the components of a system having two workholders, with common controls.

FIG. 12 illustrates the components of an extended system providing a second piston, 172, which provides workholding in a second direction. The basic control scheme for the second piston is analogous to that for the first, with valve, 174, controlling the second piston in the same manner as valve, 112, does the first, and needle valve, 176, acting as a bleed valve, controlling the delay period until the piston extends, in the same manner as needle valve, 118, does for the first piston.

Valve, 178, performs the much the same function as switch 104, alternately connecting valve, 174, to either line pressure or to needle valve, 176. It operates under control of switch 104. In a simpler alternate configuration, valve 178 could be eliminated and pistons 172 and 124 would be synchronized.

However, the inclusion of valve 178 enables significant functional capability, beyond what might be expected. First, it allows a separate bleed valve, 176, to control the extension timing of piston 172. Thus, piston 120 and 172 can be retracted at the same time, but adjusted to extend at different times.

In the simple arrangement, valves 178 and 112 operate at the same pressure, and their control ports are coupled by line, 186. In this configuration, valves 178 and 112 will operate substantially simultaneously and the system can be adjusted so that the timing of the extension of piston 172 can vary from being substantially simultaneous with piston, 112, to significantly delayed after that time. This is achieved by adjusting needle valve, 176, to vary the rate at which bleed air is released. As with valve 112, described above, valve 174 will release when the supply pressure, being bled by needle valve, 176, drops below its operating pressure. With valve, 176, wide open, this is almost instantaneous with the release of valve 178. With reduced settings of valve, 176, this is delayed. However, with valves, 112 and 178, having the same operating pressure, piston, 172, can not be extended before piston, 120.

Greater flexibility is achieved in the preferred embodiment by using a valve, 178, which operates at a higher pressure than valve, 112. As long as the supply pressure to the system is greater than both operating pressures, valve 112 and 178, both activate immediately after button switch, 104, is depressed. When the switch is released, it connects line 136, and line 186, to needle valve, 118. If valve, 118, is at least slightly open, it begins releasing pressure from the line, which is coupled to both of valves 112 and 178. As this pressure drops, it will first reach the higher operating pressure of valve, 178, causing it to release before valve, 112. The pressure will continue to drop, eventually reaching the operating pressure of valve, 112, causing it to release. Thus, valve 178 will always release before valve 112. Bleed valve, 118, can be adjusted, altering both the time to the release of valve, 178, and the subsequent delay until the release of valve 112.

Because valve, 178, is not connected directly to piston, 172, its release does not necessarily cause the piston to extend. This is because of valve, 174. When switch, 104, is pressed it supplies service pressure to valve, 178, which in turn supplies service pressure to valve, 174. However, when valve, 178, releases, it does not simply release the service pressure to valve, 174. Instead, it couples line, 188, to needle valve, 176, which also acts as a bleed valve, releasing the line pressure at a controlled rate. This effectively delays the release of valve, 174, for a controllable period after the release of valve, 178. With valve, 176, wide open, the two valves operate substantially simultaneously. Because valve, 178, releases before valve, 112, this means that valve, 174, also releases before valve, 112, and thus piston, 172, will extend before piston, 120. However, if bleed valve, 176, is adjusted to slow the release of line pressure, the release of valve, 174, is correspondingly delayed. This delay period can be made longer that the difference between the release of valve, 178, and valve, 112, with the result that valve, 174, will release later than valve, 112, and so piston, 172, will extend later than piston, 120. Thus, by adjusting the relative settings of bleed valves, 118 and 176, the system can be set so that either of the pistons will extend first. With needle valves capable of sufficiently fine adjustment, the range of time delays which can be achieved is quite broad, from almost instantaneous to a minute or more.

Clearly, other configurations could be used to also achieve these results, but the preferred embodiment offers surprising flexibility with a minimal number of very reliable parts.

This ability to adjust the system so that either piston extends first offers significant advantage in material handling. It allows, for example, a board to be first urged against a fence and then downward against the table, in sequence. Or, by reversing the sequencing, the same system will first press the material against the table, and then against the fence.

Figure 13:
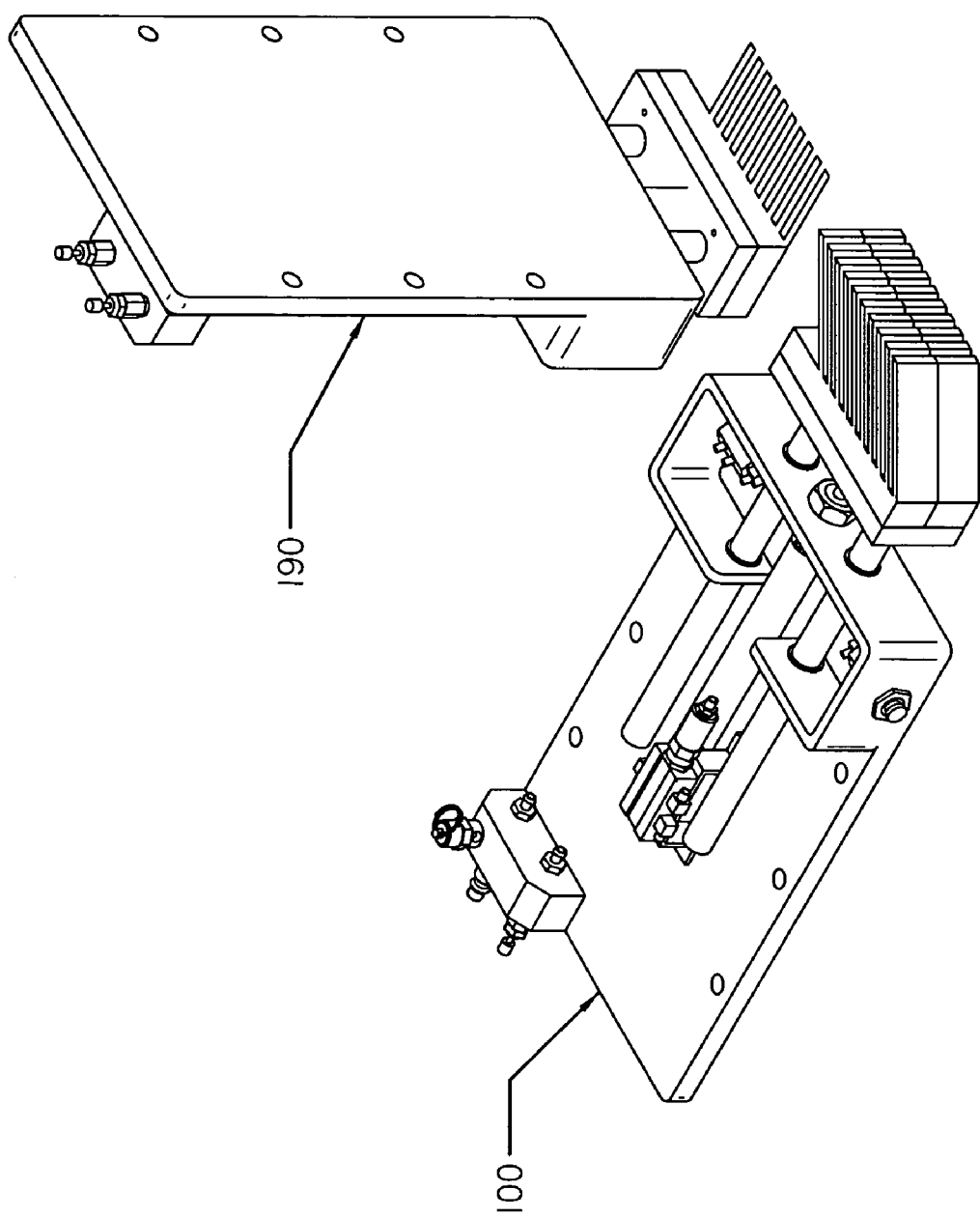
FIG. 13 is an isometric view illustrating the components of FIG. 12 arranged to provide horizontal and vertical workpiece holding.

FIG. 13 illustrates one possible configuration of the above extended system in which workholder, 100, operates horizontally as above, while workholder, 190, operates vertically. As discussed above, the present invention is not limited to use with a horizontal and vertical workholder. It is clearly also applicable to two workholders operating in the same plane, as for two locations along a fence, including an infeed and an outfeed location.

Operation

Figure 6:
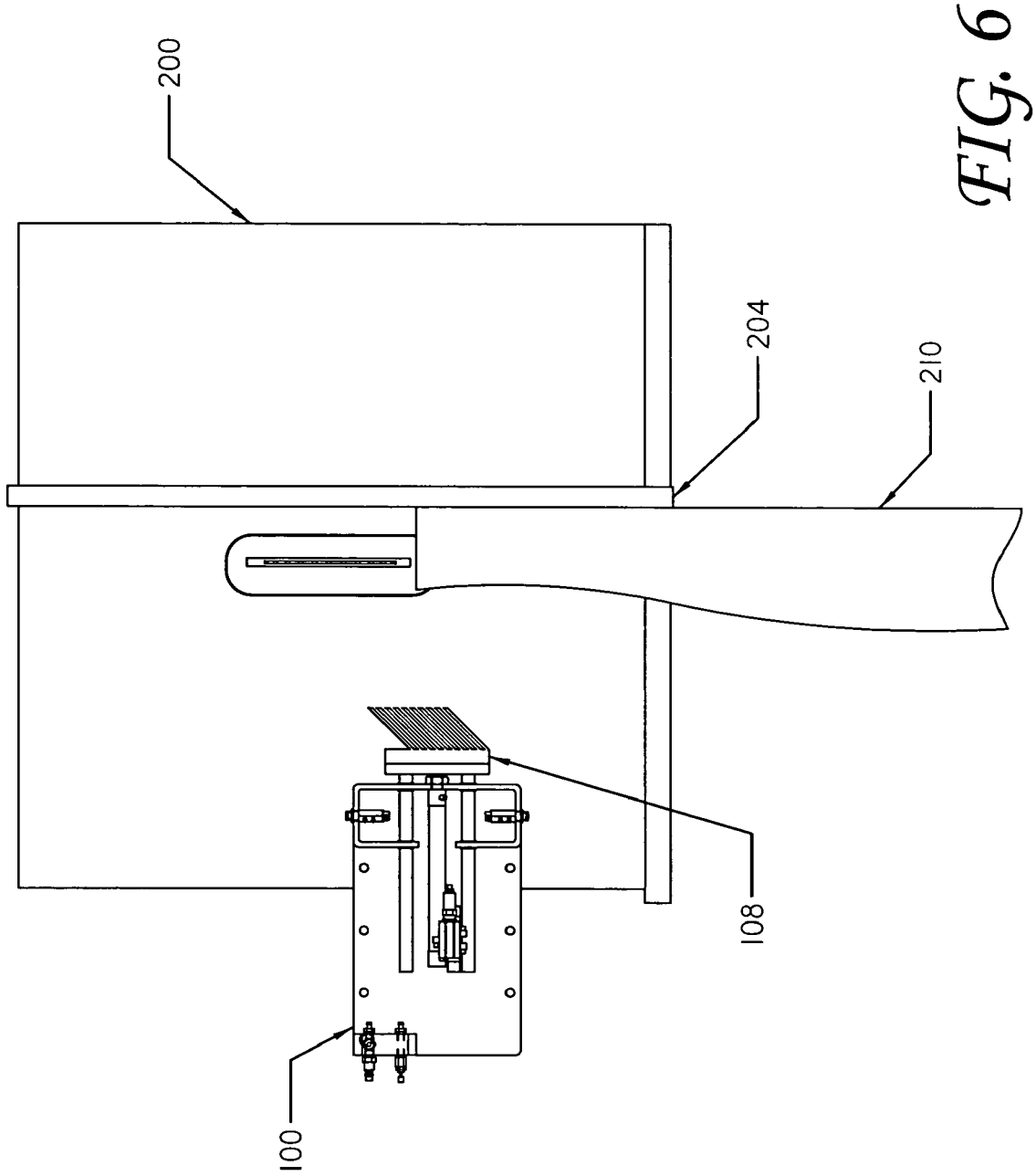
FIG. 6 illustrates the workholder, installed on a table saw, in its fully retracted position allowing placement of the workpiece.
Figure 7:
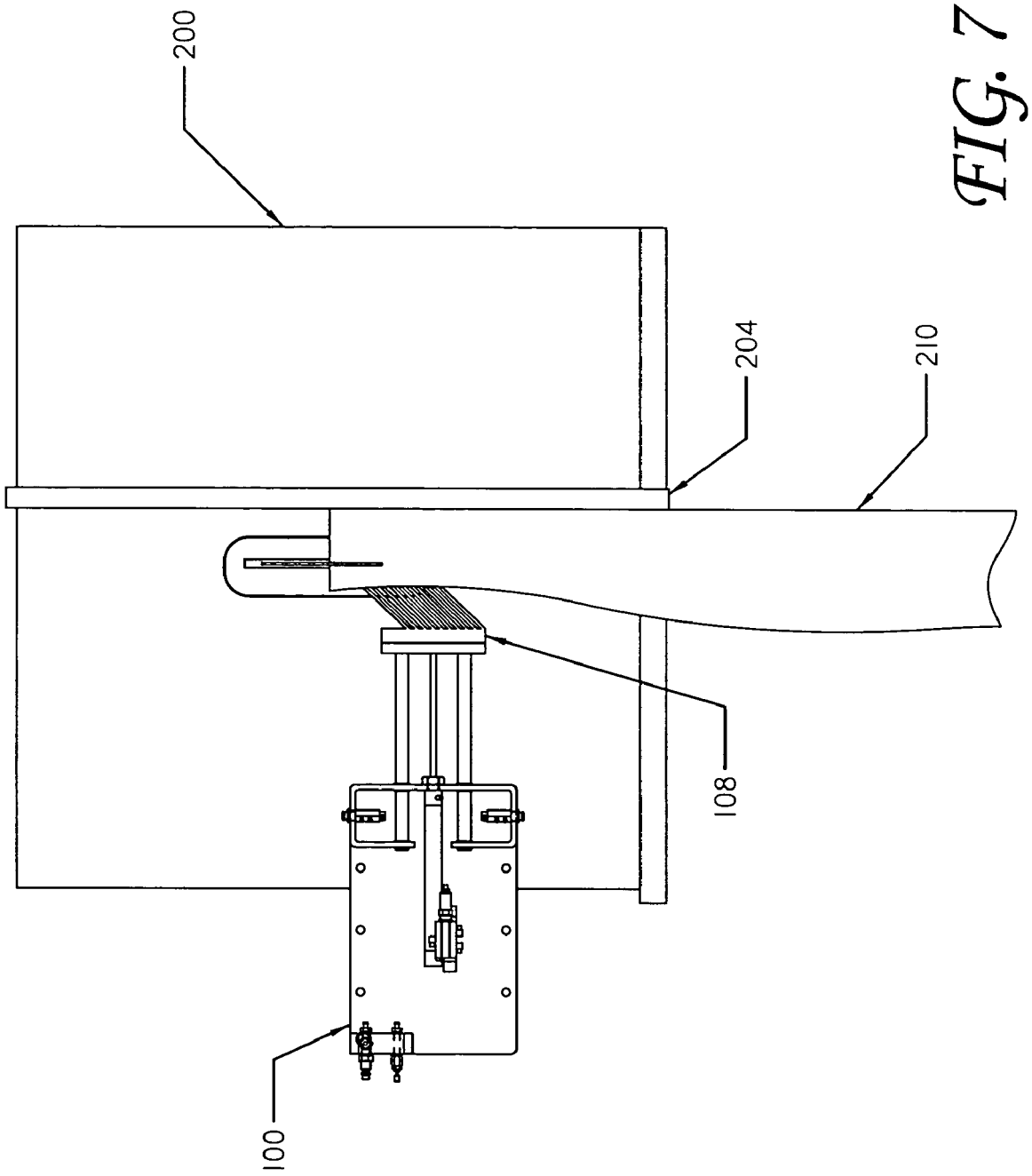
FIG. 7 illustrates the workholder, installed on a table saw, extended against the workpiece at a narrow section.
Figure 8:
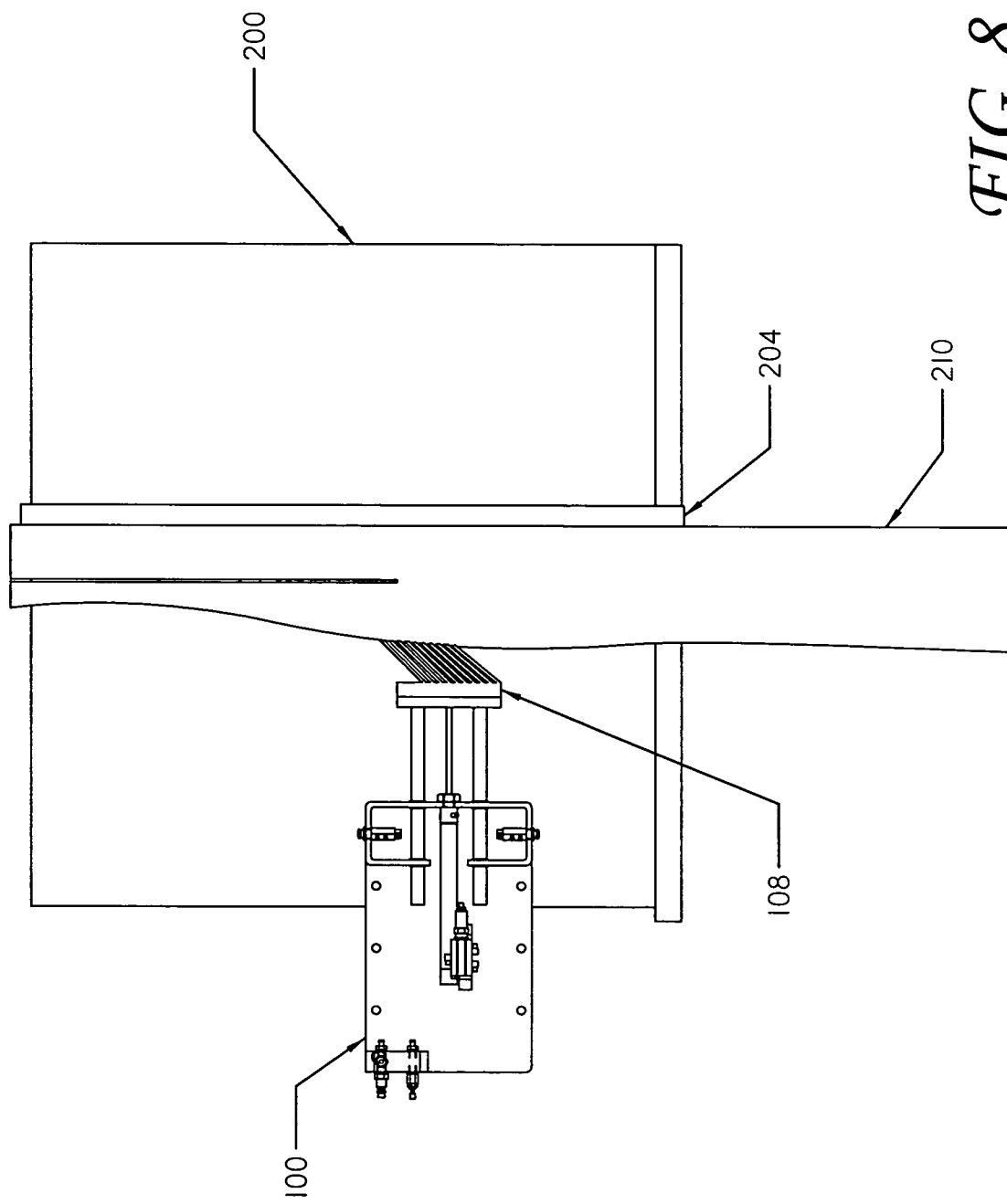
FIG. 8 illustrates the workholder, installed on a table saw, extended against the workpiece, but partially retracted, or compressed, to accommodate a wide section of the workpiece.

The operation of and individual inventive workholder is illustrated in FIGS. 6–8 where a board, 210, is being cut on a table saw, 200, fitted with the workholder, 100. At the start of the operation the head is retracted and the board positioned ahead of the blade, FIG. 6. After the time delay regulated by the bleed valve, the workholder extends until the featherboard, 108, contacts the board and the board is urged against the fence, 204. At this point, the cut can be started, FIG. 7. As the board is fed through the saw, the fingers of the featherboard will flex to follow small irregularities in the edge of the board. Larger variation in the board are accommodated by movement of the head. As shown in FIG. 8, as the edge of the board moves towards the workholder, the head is allowed to retract, maintaining constant pressure on the board and providing clearance for it to pass through the machine. As the board narrows, the head will again extend.

The use of a featherboard also helps overcome a potential problem with the piston often referred to as "stiction." While the piston has minimal frictional resistance to movement while in motion, when stationary it may require a measurably larger force to start it in motion. This could cause an undesirable increase in pressure against the workpiece until movement starts. The flexing of the featherboard helps offset this, resulting in smoother application of force to the workpiece.

The adjustable time delay allows the device to be readily adapted to different modes of operation. Where a relatively small workpiece is being handled, the delay period can be set very short, or non-existent. In this mode, the operator can depress and hold the activation switch, place the workpiece in position, and then release the switch. The workholder will immediately extend, contacting the workpiece. Where a larger workpiece is being handled the delay period can be set longer. This would allow the operator to depress the activation switch, causing the workholder to retract, step back, pick up the workpiece and position it on the machine, and then wait for the workholder to automatically extend. As discussed above, the activation switches can also be mounted remote from the frame of the device. It is also possible for the operator to use the end of the workpiece itself to activate the switch.

The extended system is operated in a similar manner. The button switches operate both pistons. Their relative timing is adjusted by altering the relative bleed rates of the two needle valves, 118 and 176, as described above.

In a conventional installation, the inventive workholder will be connected to a shop air supply comprising compressor, tank, and pipes or hoses. The combination of tank and pipes acts as an air reservoir having capacity significantly larger than the piston of the workholder. Thus, when the piston is forced to retract by a change in the contour of the board, the amount of air displaced from the piston is insignificant relative to the capacity of the entire system, so there is no appreciable pressure change. This is also true where extension of the piston consumes air. Where the air supply system has a smaller, or possibly no storage capacity, the invention could be supplemented by a reservoir or pressure relief valve to maintain a constant pressure.

Alternative Embodiments

The following discussion presents alternative embodiments which offer various advantages in structure or functions without departing from the principles of the invention.

Figure 9:
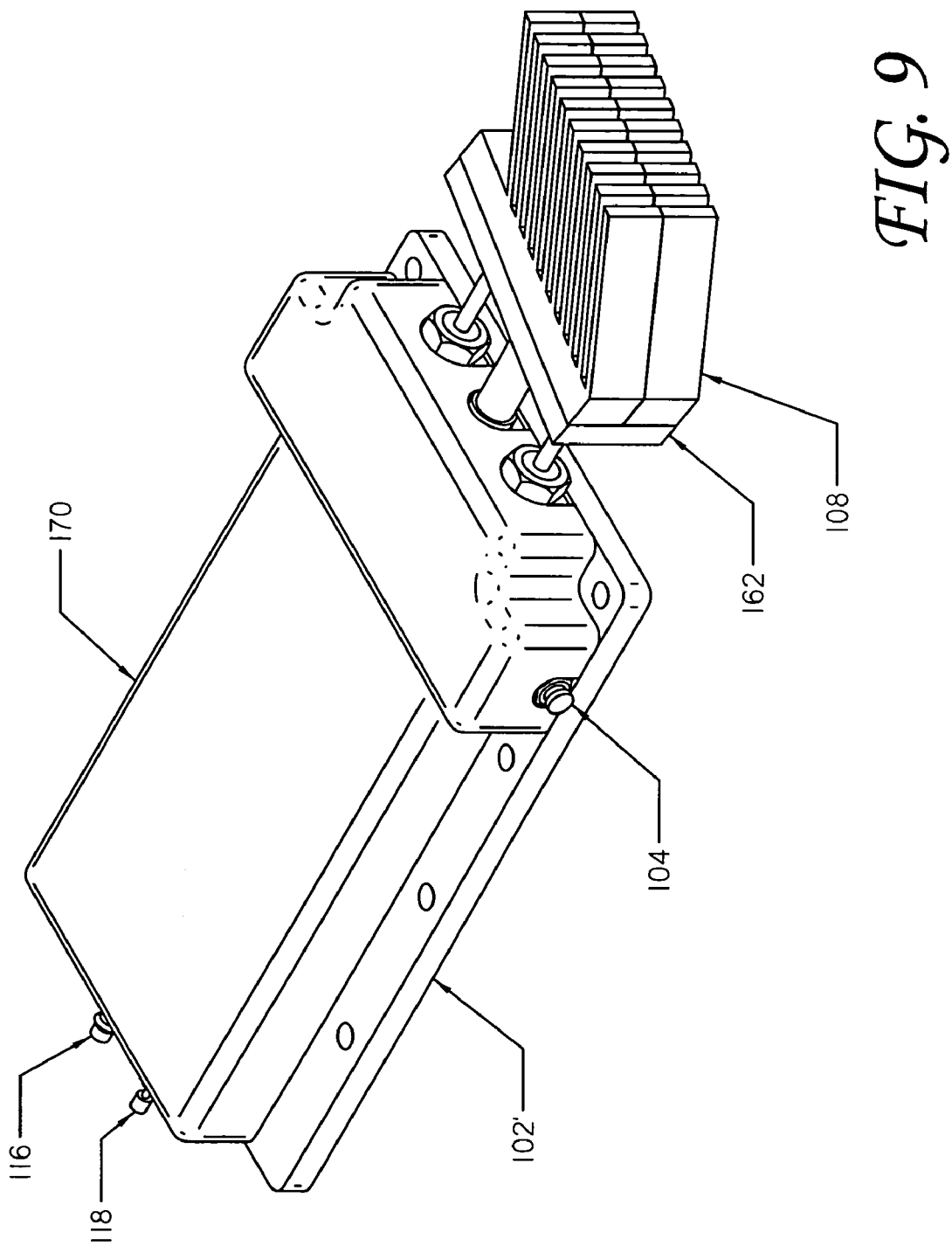
FIG. 9 is an isometric view of an alternative embodiment of the present invention with its cover in place.
Figure 10:
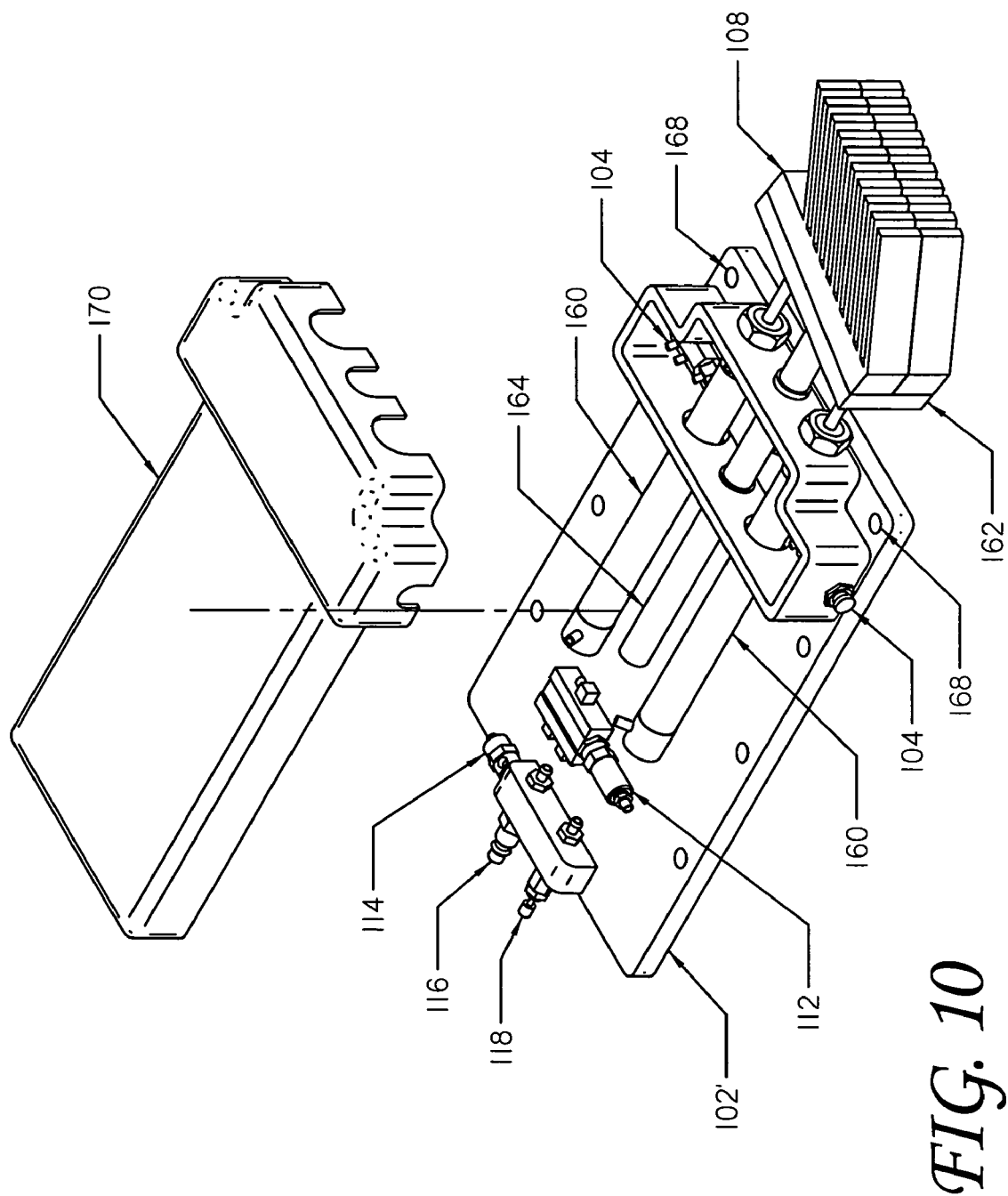
FIG. 10 is an isometric view of the alternative embodiment of FIG. 9 of the present invention with the cover exploded to reveal the internal components.
Figure 11:
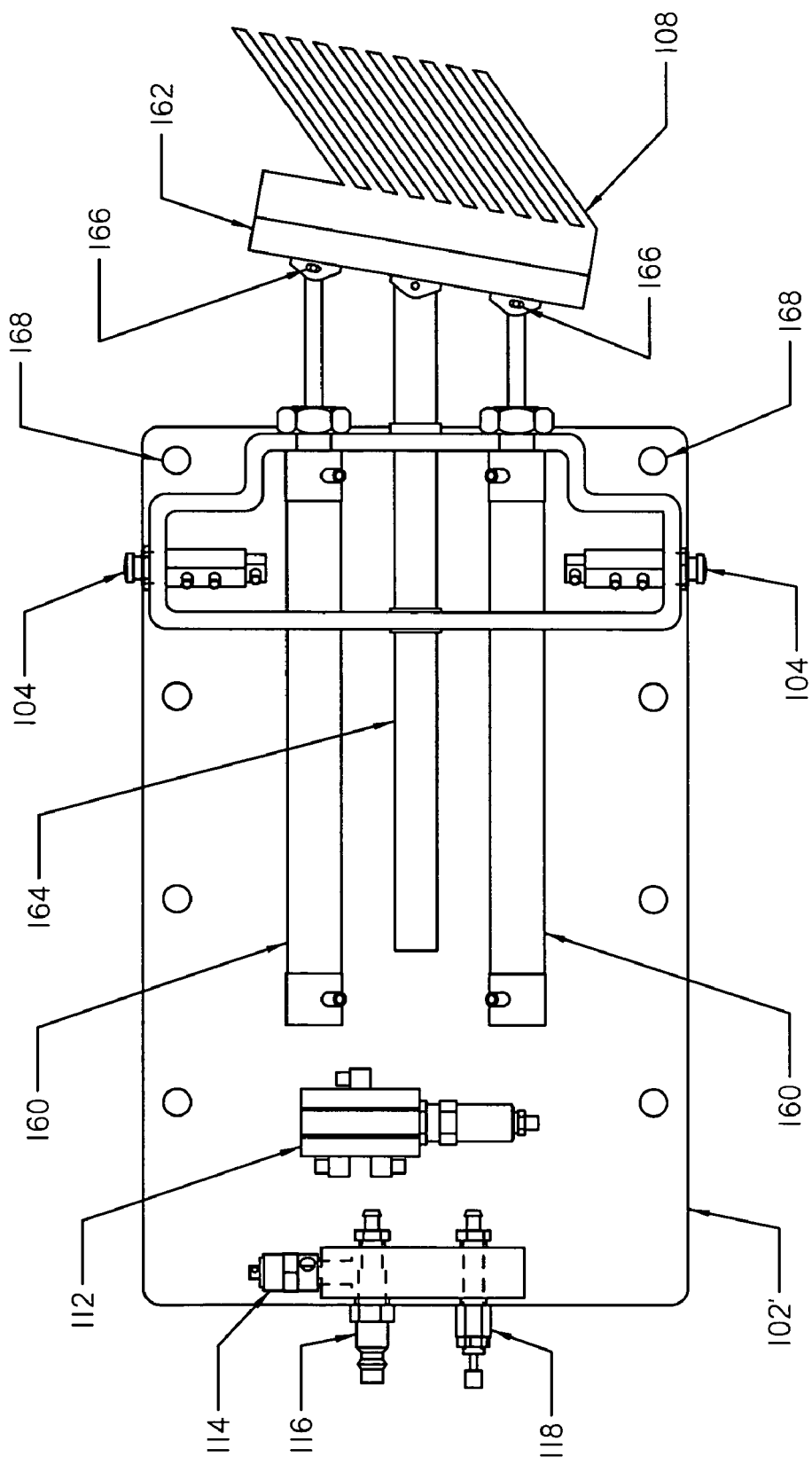
FIG. 11 is a top view of the alternative embodiment of FIG. 9 with the cover removed.

FIGS. 9–11 illustrate an alternative dual piston embodiment of the invention. Its control and general operation is the same as the preferred embodiment, above. It differs in that the head is free to pivot on the single guide rod, 164. Two pistons, 160, connect to the head and cause it to extend and retract. Since the pistons are interconnected, they are maintained at a common pressure and thus the ends of the head maintain a uniform force. This results in the head angling to follow the edge contour of the workpiece. Preferably, the piston rods are coupled to the head using pins which ride in slots, 166, allowing the head to angle without requiring a lateral displacement of the cylinder rods. Alternatively, another arrangement, such as pivoting the cylinders at their attachment to the frame, could be used. Similar, but inferior, results could be achieved by using a single piston, no guide rods, and allowing the head to pivot freely on the end of the piston rod. This configuration could be expected to exhibit increased cylinder wear and less uniform pressure on the workpiece.

The embodiment of FIGS. 6–8 also utilizes a modified frame, 102', which incorporates additional mounting holes, 168, and which has been adapted to accept a cover, 170. The location and mounting of some of the pneumatic components has been altered to accommodate the cover.

While the featherboard offers certain advantages in adjusting to small variations in the workpiece, it is not essential to the present invention. It could be replaced as a workpiece contact by one or more rollers; a leaf spring arrangement; a low drag skid (such as UHDPE plastic) optionally backed by a resilient layer such as high density foam rubber; or any other of a variety of contact means. These contact elements could be made interchangeable to allow the operator to adapt the workholder to the specific type of workpiece being handled.

While the preferred form of the invention has been disclosed above, alternative methods of practicing the invention are readily apparent to the skilled practitioner. The above description of the preferred embodiment is intended to be illustrative only and not to limit the scope of the invention.

We claim:

1. A compliant system of at least two workholders for use with a machine having a table which supports a workpiece, each of said workholders comprising:
   (a) a frame adapted to attach to the machine table;
   (b) at least one guide rod slidably attached to said frame, having proximal and distal ends;
   (c) a head attached to said distal end of said guide rod;
   (d) means for extending said head against the workpiece with substantially constant pressure; and
   (e) means for retracting said head;
   each of said means for extending and means for retracting being responsive to input from an operator.

2. The compliant workholder system of claim 1 wherein each of said workholders further comprises timing means, regulating said extending and retracting means, whereby each of said heads remains retracted for a controllable time period after said operator input.

3. The compliant workholder system of claim 2 wherein said timing means are controllable such that said time period is individually adjustable for each of said workholders.

4. The compliant workholder system of claim 3 wherein either of said workholders can be made to extend before the other.

5. A compliant system of at least two workholders for use with a machine having a table which supports a workpiece, each of said workholders comprising:
   (a) a frame adapted to attach to the machine table;
   (b) at least one guide rod slidably attached to said frame, having proximal and distal ends;
   (c) a head attached to said distal end of said guide rod;
   (d) an extension mechanism to urge said head outward against the workpiece with substantially constant pressure when activated;
   (e) a retraction mechanism, to retract said head inward proximate said frame, when activated; and
   (f) a control device, responsive to an operator input by activating said retracting mechanism, and activating said extension mechanism in the absence of said user input.

6. The compliant workholder system of claim 5 wherein said retraction mechanism and said extension mechanism comprise a double acting fluid power cylinder.

7. The compliant workholder system of claim 5 wherein each of said control device comprises a time delay device which causes said retraction mechanism to remain activated for a certain delay period after said operator input terminates and delays activation of said extension mechanism for the same said delay period.

8. The compliant workholder system of claim 7 wherein each of said control devices is responsive to the same, single, operator input and each of said delay periods can be separately varied by the operator.

9. A system of at least two compliant workholders for use with a machine having a table and a workpiece guide, each of said workholders comprising:
   (a) a frame adapted to attach to the machine table;
   (b) at least one guide rod, having proximal and distal ends, slideably attached to said frame;
   (c) a head attached to the distal end of said guide rod;
   (d) a double acting pneumatic piston, mounted to said frame and acting on said head to cause it to extend outward toward the workpiece guide and retract inward proximate said frame; and
   (e) a control valve, regulating air flow to said pneumatic piston whereby said piston retracts when said valve is activated and extends when said valve is inactive;
   said system further comprising at least one momentary switch coupled to each of said control valves whereby said valve is activated when said switch is pressed; and an air coupling, adapted to be connected to an external air source and providing the air to each of said pistons and said control valves.

10. The compliant workholder system of claim 9 wherein each of said workholders further comprises an adjustable time delay device coupled to said control valve which causes said valve to remain activated for a certain delay period after said momentary switch is released.

11. The compliant workholder system claim 10 wherein said delay periods can be varied by the operator.

12. The compliant workholder system of claim 10 further comprising an intermediate valve, operated by said momentary switch and coupling a first of said control valves to said time delay device, said intermediate valve operating in the same manner but at a higher pressure than the second of said control valves whereby said first control valve can be caused to be connected to said time delay device prior to said second control valve being connected to its time delay device.

* * * * *